April 6, 1948. M. MARCHAND 2,439,178
ILLUMINATED ORNAMENT
Filed Sept. 25, 1946
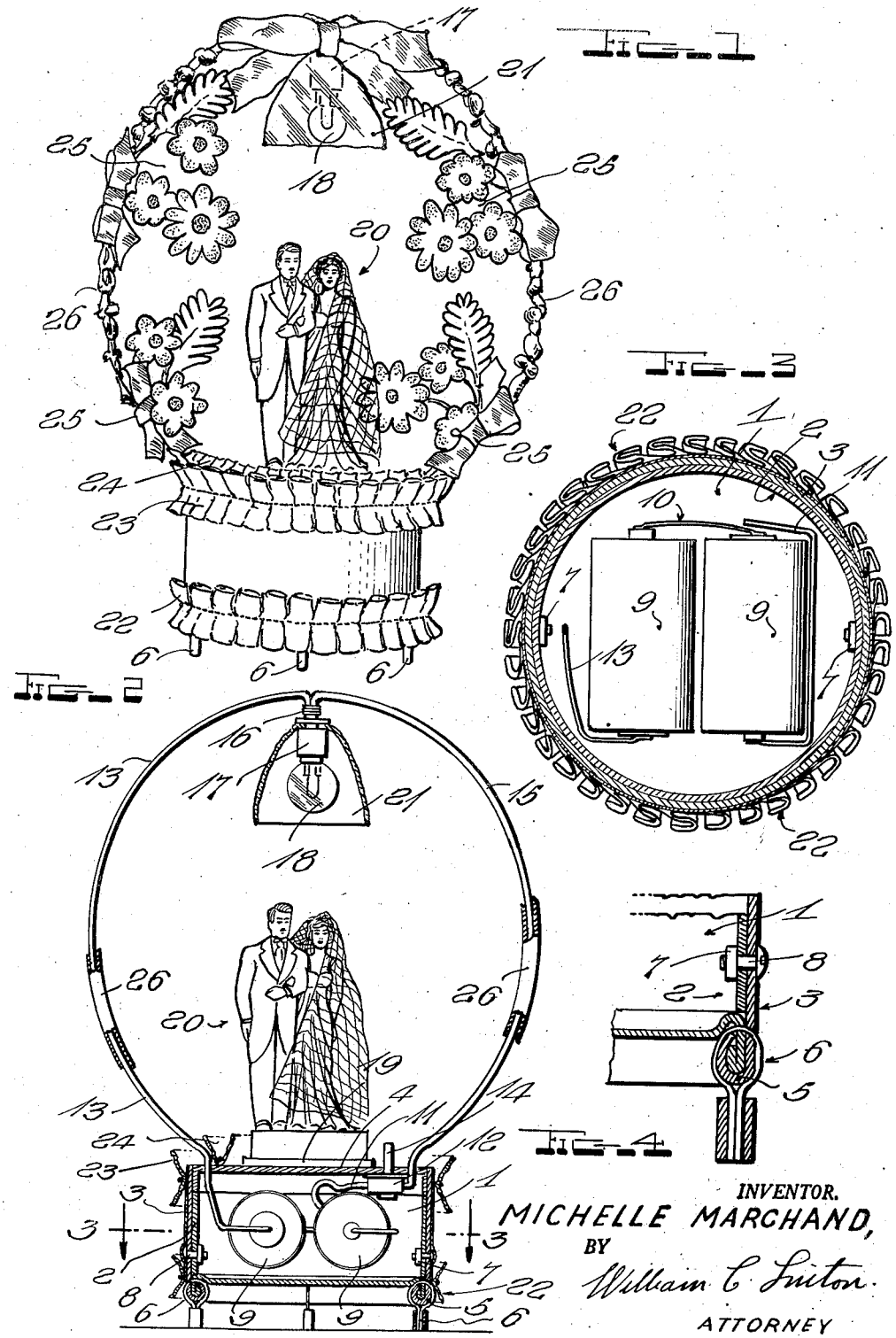
INVENTOR.
MICHELLE MARCHAND,
BY
William C. Sutton
ATTORNEY Patented Apr. 6, 1948

2,439,178

UNITED STATES PATENT OFFICE 2,439,178

ILLUMINATED ORNAMENT

Michelle Marchand, Flushing, N. Y.

Application September 25, 1946, Serial No. 699,312

1 Claim. (Cl. 240—10)

The present invention relates to highly and richly decorative ornaments and more particularly to a self-contained electrically illuminated ornament for wedding cakes which, when it has served its purpose, may again be used as a souvenir or a night or boudoir lamp.

An object of the invention is to provide a small, inexpensive and highly decorative portable ornament for wedding cakes comprising a container capable of housing suitable storage batteries and supporting a bridal wreath as well as a nuptial couple and a miniature lamp supplied with electrical energy from said batteries whereby the rays of light from said lamp add greatly to the attractiveness of the ornament, all of which while having a fragile appearance will yet be sufficiently strong and rigid that it may have repeated use and long life of service.

Other objects of the invention will be in part obvious and in part pointed out hereinafter as the description continues.

In the accompanying drawings:

Fig. 1 is a perspective view of the ornament embodying the invention.

Fig. 2 is a vertical sectional view thereof.

Fig. 3 is a horizontal section taken on the line 3—3 of Fig. 2 in the direction of the arrow points, and Fig. 4 is an enlarged detail sectional view.

Referring more particularly to the drawings, my ornament comprises a cylindrical base consisting of a storage section 1 and a cover section 2 both formed from cardboard. Each section consists of a cylindrical wall 3 having one end closed by means of a plate 4. The extremities of each plate being fitted within the overturned edges of the wall 3 thereby forming a reinforcing bead 5. To the bead 5 of the storage section are stapled the wire legs 6. There are preferably four supporting legs and each leg has a protective covering whereby the legs may be used for elevating the ornament upon a solid support such as a table top or they may be imbedded within a wedding cake for more rigidly supporting the ornament thereupon. Arranged diametrically opposite upon the inner face of the cylindrical wall 3 of the storage section there are secured the nuts 7 which receive the threaded ends of the screws 8 as a means for detachably connecting the sections 1 and 2 together.

Positioned within the storage section 1 is a pair of ordinary flashlight batteries 9 with the positive terminal of one battery being electrically connected as at 10 to the negative terminal of the other battery. From the other or exposed positive terminal of one battery extends a lead wire 11 which in turn is connected to the switch 12 and another lead wire 13 extends from the negative or exposed terminal of the other battery. The connections between the wires and the battery terminals may be permanent or they may be of the clip-on type in case the batteries need replacement.

The switch 12 is secured to the under side of the plate 4 of the cover section 1 having a push button 14 extending through this plate so as to be readily accessible for the manual operation thereof. Whereas, I have shown a switch 12 of the push button type, any other conventional switch may be employed as preference or conditions may dictate.

The lead wire 13 together with the lead wire 15 are preferably of heavy gauge so that as they extend through the diametrically opposite sides of the plate 4 of the cover section they may be formed into an arch and retain this so formed arch configuration. The opposite ends of the wires 13 and 15 are tied or fastened together as at 16 and lead within a miniature lamp socket 17 having the lamp 18 positioned therein so that as the switch 12 is closed, the current from the batteries 9 will cause the lamp to glow.

Secured to the outer face of the plate 4 of the cover section 1 is a disc 19 forming a platform for the statuette 20 being shown herein as a doll-size nuptial couple. This statuette is positioned directly below the lamp 18 and the bell-shaped transparent reflector 21 directs the rays of light from the lamp directly upon this statue.

The exterior of the base and arch are richly and highly ornamental and as shown, this ornamentation is comparable with that of most bridal ornaments.

The outer face of the wall 4 of the cover section is entirely covered with a white satin cloth with a white satin pleated ruffle 22 encircling the lower end thereof and another pleated ruffle 23 encircling the upper end thereof. Another pleated ruffle 24 is fastened to the other face of the plate 4 of the cover section and arranged between the platform 19 and the ruffle 23.

A satin trimming 26 covers the wires 13 and 15 as well as the connection 16 of the arch and projecting inwardly from each wire 13 and 15 are two clusters 25 of small white flowers intermingled with other ornaments which, with the arch, form a bridal wreath.

This ornament as constructed, being highly ornamental, has the appearance of being fragile, yet it is sufficiently rigid and sturdy as to be used upon wedding cakes. However, after serving its intended purpose, the ornament may be removed and kept as a souvenir for a considerable length of time without deteriorating or it may be used as a night light or a boudoir lamp.

By removing the screws 8 the cover section 1 together with the lamp, statue and all ornaments thereupon may be separated from the compartment or storage section 2, whereby access may be gained to the batteries 9 for replacing the same and after new batteries are installed the cover section can be replaced and the future use of the ornament be continued with.

I claim:

A self-contained and electrically illuminated bridal ornament for wedding cakes comprising a cylindrical base member consisting of a storage section and a cover section formed from sheets of cardboard, a bead formed with the lower edge of said storage section, relatively thin supporting legs secured to said bead and projecting therefrom, means for detachably connecting the sections of said base member together, batteries arranged within said base member, a switch secured to said base member, lead wires extending from said base member and formed into an arch, means for fastening the opposite ends of said lead wires, a miniature lamp suspended from said fastening means and in series with said batteries and switch, a statuette comprising a nuptial couple positioned upon said base member directly below said lamp, a bell reflector for said lamp reflecting the rays of light therefrom upon said statuette, bridal ornaments surrounding said cover section of said base member and bridal ornaments projecting inwardly from the arch towards said statuette.

MICHELLE MARCHAND.

REFERENCES CITED

The following references are of record in the file of this patent:

UNITED STATES PATENTS

| Number | Name | Date |
|---|---|---|
| 976,587 | McNair | Nov. 22, 1910 |
| 2,027,575 | Buck | Jan. 14, 1936 |
| 2,083,240 | Pollock | June 8, 1937 |